United States Patent
Oomen et al.

[15] 3,644,150
[45] Feb. 22, 1972

[54] STABILIZING OF AQUEOUS SOLUTIONS OF POTASSIUM PERSULPHATE

[72] Inventors: Joris Jan Cornelis Oomen; Jan Adrianus Visser, both of Emmasingel, Eindhoven, Netherlands

[73] Assignee: U.S. Philips Corporation, New York, N.Y.

[22] Filed: Nov. 7, 1969

[21] Appl. No.: 874,962

[52] U.S. Cl. ................................136/137, 23/121, 136/154, 252/186
[51] Int. Cl. .....................................................H01m 15/04
[58] Field of Search .........................136/100, 137, 154, 155; 23/121; 252/186

[56] References Cited

UNITED STATES PATENTS

| 1,147,753 | 7/1915 | Schatzel | 136/137 |
| 2,534,403 | 12/1950 | Blake et al. | 136/137 |
| 3,444,002 | 5/1969 | Wijnen et al. | 136/155 |

FOREIGN PATENTS OR APPLICATIONS

| 475,032 | 8/1929 | Germany | 136/137 |
| 659,461 | 5/1938 | Germany | 136/137 |
| 1,055,472 | 1/1967 | Great Britain | 136/137 |

Primary Examiner—Donald L. Walton
Attorney—Frank R. Trifari

[57] ABSTRACT

Aqueous solutions of potassium persulfate may be stabilized by a sulfonic acid salt.

7 Claims, No Drawings

STABILIZING OF AQUEOUS SOLUTIONS OF POTASSIUM PERSULPHATE

The invention relates to stabilized aqueous solutions of potassium persulfate, and particularly to a primary cell in which potassium persulfate is used as a depolarizer.

It is known that potassium persulfate in an aqueous solution is unstable. Such potassium persulfate solutions decompose while releasing oxygen. Attempts have been made to increase the stability of potassium persulfate in aqueous solutions by addition of other potassium salts which are satisfactorily soluble in water such as potassium chloride. Stabilizer effects however of these salts are only minor.

It has been found that the stability of potassium persulfate in aqueous solutions can be increased considerably by addition of potassium salts of certain organic sulfonic acids.

The invention relates to an aqueous solution of potassium persulfate, and is characterized in that this solution contains a potassium of an organic sulfonic acid whose solubility in water of 25° C. is larger than 1 g. eq./l. Such a salt, both in a solid state and in a solution, is referred to in this respect as a stabilizer. Suitable stabilizers are especially potassium salts of methane mono sulfonic acid, ethane disulfonic acid, ethane trisulfonic acid, benzene disulfonic acid, benzene trisulfonic acid.

Experiments have further shown that the potassium salt of methane monosulfonic acid yields the best results; next best results are achieved with the potassium salt of benzene disulfonic acid.

Aqueous solutions of potassium persulfate are, inter alia, used as oxidants for pigmentation agents, as etchants for metals and as depolarizers in primary cells. In these cases the invention may advantageously be used. This particularly applies to the use for primary cells in which potassium persulfate is used as a depolarizer. The invention therefore particularly relates to a primary cell in which potassium persulphate as a depolarizer and a stabilizer have been used according to the invention.

An embodiment of a primary cell according to the invention is the one in which the anode consists of zinc, the separator consists of a cation-exchanging diaphragm, and the cathode, also sometimes called depolarizer mass, consists of a compressed mass mainly comprising pulverulent carbon, for example, graphite or carbon felt, and includes a depolarizer and a stabilizer and wherein furthermore a collector, for example, a rod or plate of graphite is used.

Primary cells according to the invention may be manufactured in manners known for such cells.

The corrosion resistance of the zinc anode may be enhanced in known manner by treatment with a mercuric chloride solution.

Cation-exchanging diaphragms which are known per se and consist, for example, of a sulfonated copolymer of styrene and divinyl benzene, may be used as separators. Such diaphragms are also sometimes called negative diaphragms. They prevent the passage of negative ions, but allow the positive ions, the cations, to pass.

As in the known primary cells, pulverulent graphite may be used, for example, for the carbon to be used in the depolarizer mass. Carbon felt is preferred, inter alia, because this can more easily be purified by a pretreatment from substances which promote the decomposition of potassium persulphate; purification may be effected, for example, by etching with a mixture of chromium acid-sulfuric acid-water.

When manufacturing the depolarizer mass, the starting material may be a mixture of pulverulent carbon or carbon felt and pulverulent potassium persulphate. This mixture may also contain a stabilizer in a pulverulent form.

The applicant has found by experiments that there is a relationship between the stabilizing action of a stabilizer and the solubility thereof in water. The greater this solubility the greater the stabilizing action. The following stabilizers are therefore preferred: potassium salt of benzene disulphonic acid, of benzene trisulphonic acid, and of methane monosulphonic acid, in the given sequence.

Furthermore it has been found that the concentration of stabilizer is to be preferably at least 1.5 g. eq./l. for a satisfactory stabilizing action in the cathode liquid (which is the liquid contained in the cathode space with which liquid also the depolarizer mass is soaked). Furthermore it has been found that when increasing the concentration of stabilizer to more than 2.5 g. eq./l. stabilizing action substantially does not increase any more, or in other words, at a concentration of approximately 2.5 g. eq./l. the stabilizing action is optimum.

Furthermore it has been found that the stabilizing action of a stabilizer may be increased by incorporating in the depolarizer mass a substance acting as a buffer so that the pH in this mass is maintained between 5.5 and 8.5 and preferably between 6 and 8. Suitable substances are particularly zinc oxide, aluminum oxide which has not been rendered entirely anhydrous and aluminum hydroxide.

The stabilizing action of stabilizers according to the invention was examined by way of experiments in which aqueous solutions which contain potassium persulfate and stabilizer and to which zinc oxide was added as a buffer were maintained at 45° C. and in which the amount of gas evolving with time was determined. For comparison, experiments were made with solutions to which potassium chloride or potassium sulphate had been added instead of a stabilizer according to the invention.

The experiments were performed in a glass vessel provided with a calibrated tube, in which the evolved gas was collected. The amount of evolved gas was determined from day to day. For illustration of the action of the stabilizers the Table below shows in how many days 1 ml. of gas had been evolved.

Seventy-five milliliters of solution were used for each experiment. This solution always contained 10 g. of potassium persulfate, while 1 g. of zinc oxide was added in each case.

Furthermore the experimental mixture contained: for experiment

| | |
|---|---|
| A: 3.0 g. eq./l. | potassium chloride; |
| B: 1.5 g. eq./l. | potassium sulfate; |
| C: 0.5 g. eq./l. | methane monopotassium sulfonate. |
| D: 1.0 g. eq./l. | methane monopotassium sulfonate. |
| E: 1.5 g. eq./l. | methane monopotassium sulfonate. |
| F: 3.0 g. eq./l. | methane monopotassium sulfonate. |
| G: 0.5 g. eq./l. | benzene-1,3-dipotassium sulfonate. |
| H: 1.0 g. eq./l. | benzene-1,3-dipotassium sulfonate. |
| I: 1.5 g. eq./l. | benzene-1,3-dipotassium sulfonate. |
| K: 3.0 g. eq./l. | benzene-1,3-dipotassium sulfonate; |
| L: 3.0 g. eq./l. | benzene-1,3-5-tripotassium sulfonate. |

TABLE

| Experiment | Number of days during which 1 ml. of gas has evolved. |
|---|---|
| A | 1.9 |
| B | 2.3 |
| C | 1.8 |
| D | 18.3 |
| E | 24.2 |
| F | 31.9 |
| G | 8.6 |
| H | 14.0 |
| I | 28.1 |
| K | 28.9 |
| L | 15 |

The stabilizing action of stabilizers according to the invention is clearly evident from these results.

What is claimed is:

1. An aqueous solution of potassium persulphate, characterized in that this solution contains as a stabilizer a potassium salt of an organic sulphonic acid whose solubility in water of 25° C. is larger than 1 g. eq./l.

2. An aqueous solution of potassium persulphate as claimed in claim 1, characterized in that a potassium salt of methane monosulphonic acid, methane disulphonic acid, methane trisulphonic acid, ethane disulphonic acid, ethane trisulphonic acid, benzene disulphonic acid, benzene trisulphonic acid, toluene disulphonic acid, or toluene trisulphonic acid is used as a stabilizer.

3. An aqueous solution of potassium persulphate as claimed in claim 2, characterized in that a potassium salt of methane monosulphonic acid or benzene disulphonic acid is used as a stabilizer.

4. An aqueous solution of potassium persulphate as claimed in claim 2, characterized in that the concentration of stabilizer is at least 1.5 g. eq./l. and particularly 1.5–2.5 g. eq./l.

5. An aqueous solution of potassium persulphate as claimed in claim 4, characterized in that a substance acting as a buffer is used which maintains the pH of the solution between 5.5 and 8.5 and preferably between 6.0 and 8.0.

6. An aqueous solution of potassium persulphate as claimed in claim 5, characterized in that zinc oxide, aluminum oxide, or aluminum hydroxide is used as a substance acting as a buffer.

7. A primary cell containing, as a depolarizer, the aqueous solution of claim 1.

* * * * *